US012687719B2

(12) United States Patent
Kato et al.

(10) Patent No.: US 12,687,719 B2
(45) Date of Patent: Jul. 21, 2026

(54) HEAD-UP DISPLAY AND DISPLAY DEVICE

(71) Applicant: Magnolia White Corporation, Tokyo (JP)

(72) Inventors: Takayuki Kato, Tokyo (JP); Shinichiro Tanaka, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 455 days.

(21) Appl. No.: 18/196,123

(22) Filed: May 11, 2023

(65) Prior Publication Data

US 2023/0384586 A1      Nov. 30, 2023

(30) Foreign Application Priority Data

May 25, 2022    (JP) .................................. 2022-085211

(51) Int. Cl.
*G02B 27/01* (2006.01)
*G02F 1/1335* (2006.01)
(52) U.S. Cl.
CPC ... *G02B 27/0101* (2013.01); *G02F 1/133607* (2021.01)
(58) Field of Classification Search
CPC ........ G02B 27/0101; G02B 2027/0118; B60R 2300/205; B60R 35/23; B60R 35/231; B60R 35/234
See application file for complete search history.

(56) References Cited

U.S. PATENT DOCUMENTS

2009/0103060 A1* 4/2009 Hirata .................. H04N 9/3155
353/122
2017/0359558 A1 12/2017 Harada et al.
2019/0162960 A1* 5/2019 Harada ............. G02B 27/0101

FOREIGN PATENT DOCUMENTS

JP        2007-264529 A    10/2007
JP        2015-064472 A     4/2015
JP        2017-219755 A    12/2017

OTHER PUBLICATIONS

Office Action issued in related Japanese Patent Application No. 2022-085211 on Feb. 24, 2026 and English translation of same. 6 pages.

* cited by examiner

*Primary Examiner* — Angela M. Medich
(74) *Attorney, Agent, or Firm* — K&L Gates LLP

(57)        ABSTRACT

According to an aspect, a head-up display includes: a light source; a liquid crystal panel that is configured to transmit light emitted from the light source and projects an image; and a prism sheet that is tilted with respect to a plate surface of the liquid crystal panel and configured to refract light transmitted through the liquid crystal panel.

4 Claims, 6 Drawing Sheets

HEAD-UP DISPLAY AND DISPLAY DEVICE

CROSS-REFERENCE TO RELATED APPLICATION

This application claims the benefit of priority from Japanese Patent Application No. 2022-085211 filed on May 25, 2022, the entire contents of which are incorporated herein by reference.

BACKGROUND

1. Technical Field

What is disclosed herein relates to a head-up display and a display device.

2. Description of the Related Art

Display devices have been known that are applied to vehicle head-up display devices, which project an image onto a light-transmitting body such as a windshield to cause a user to visually recognize a virtual image (e.g., Japanese Patent Application Laid-open Publication No. 2007-264529 (JP-A-2007-264529)). An example of the display devices includes a backlight, a liquid crystal display panel that transmits light emitted from the backlight and projects an image, a prism sheet that refracts light transmitted through the liquid crystal display panel, and a housing.

The display device disclosed in JP-A-2007-264529 may have a possibility of reducing visibility of the virtual image when external light such as sunlight is reflected by the prism sheet and the reflected light overlaps with the virtual image.

For the foregoing reasons, there is a need for a head-up display and a display device capable of reducing deterioration of visibility of the virtual image that would be caused by overlapping of reflected light of external light and the virtual image.

SUMMARY

According to an aspect, a head-up display includes: a light source; a liquid crystal panel that is configured to transmit light emitted from the light source and projects an image; and a prism sheet that is tilted with respect to a plate surface of the liquid crystal panel and configured to refract light transmitted through the liquid crystal panel.

According to an aspect, a display device includes: a light source; a liquid crystal panel that is configured to transmit light emitted from the light source and projects an image; and a prism sheet that is tilted with respect to a plate surface of the liquid crystal panel and configured to refract light transmitted through the liquid crystal panel.

DETAILED DESCRIPTION

Figure 1:
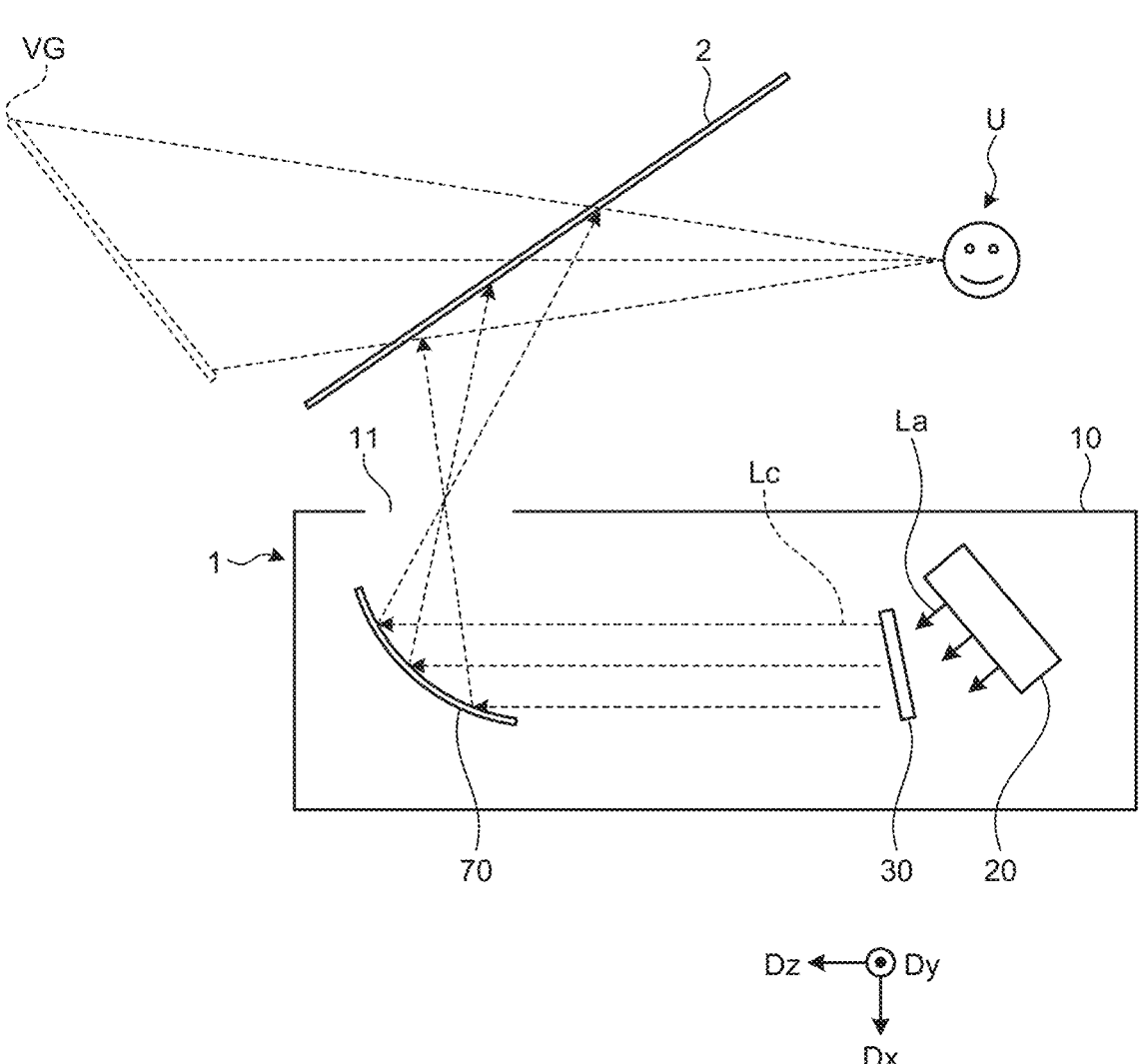
FIG. 1 is a schematic diagram of a head-up display according to an embodiment.

Hereinafter, an embodiment of the present disclosure will be described with reference to the drawings. Contents described in the following embodiment do not limit the present disclosure. Components described below include those that can be easily assumed by those skilled in the art and substantially the same components. Furthermore, the components described below can be appropriately combined.

What is disclosed herein is merely an example, and it is needless to say that appropriate modifications within the gist of the invention at which those skilled in the art can easily arrive are encompassed in the scope of the present disclosure. In the drawings, widths, thicknesses, shapes, and the like of the components can be schematically illustrated in comparison with actual modes for clearer explanation. They are, however, merely examples and do not limit interpretation of the present disclosure. In the present specification and the drawings, the same reference numerals denote components similar to those described before with reference to the drawing that has already been referred to, and detail explanation thereof can be appropriately omitted.

The Dx direction illustrated in the drawings is a height direction of a head-up display 1. The Dy direction is a width direction of the head-up display 1. The Dz direction is a depth direction of the head-up display 1. The Dx, Dy, and Dz directions are by way of examples. The present disclosure does not limit directions to the examples.

FIG. 1 is a schematic diagram of the head-up display 1 according to the embodiment. The head-up display (hereinafter, described as the HUD) 1, which is an example of a display device, projects an image onto a light-transmitting body 2 to cause a user U to visually recognize a virtual image VG. The light-transmitting body 2 is a windshield, for example. The light-transmitting body 2 is not limited to the windshield and may be any structure onto which an image of the HUD 1 can be projected.

The HUD 1 includes a housing 10, a light source 20, an image output device 30, and an optical member 70. The housing 10, which has a box shape, contains the light source 20, the image output device 30, and the optical member 70.

Figure 2:
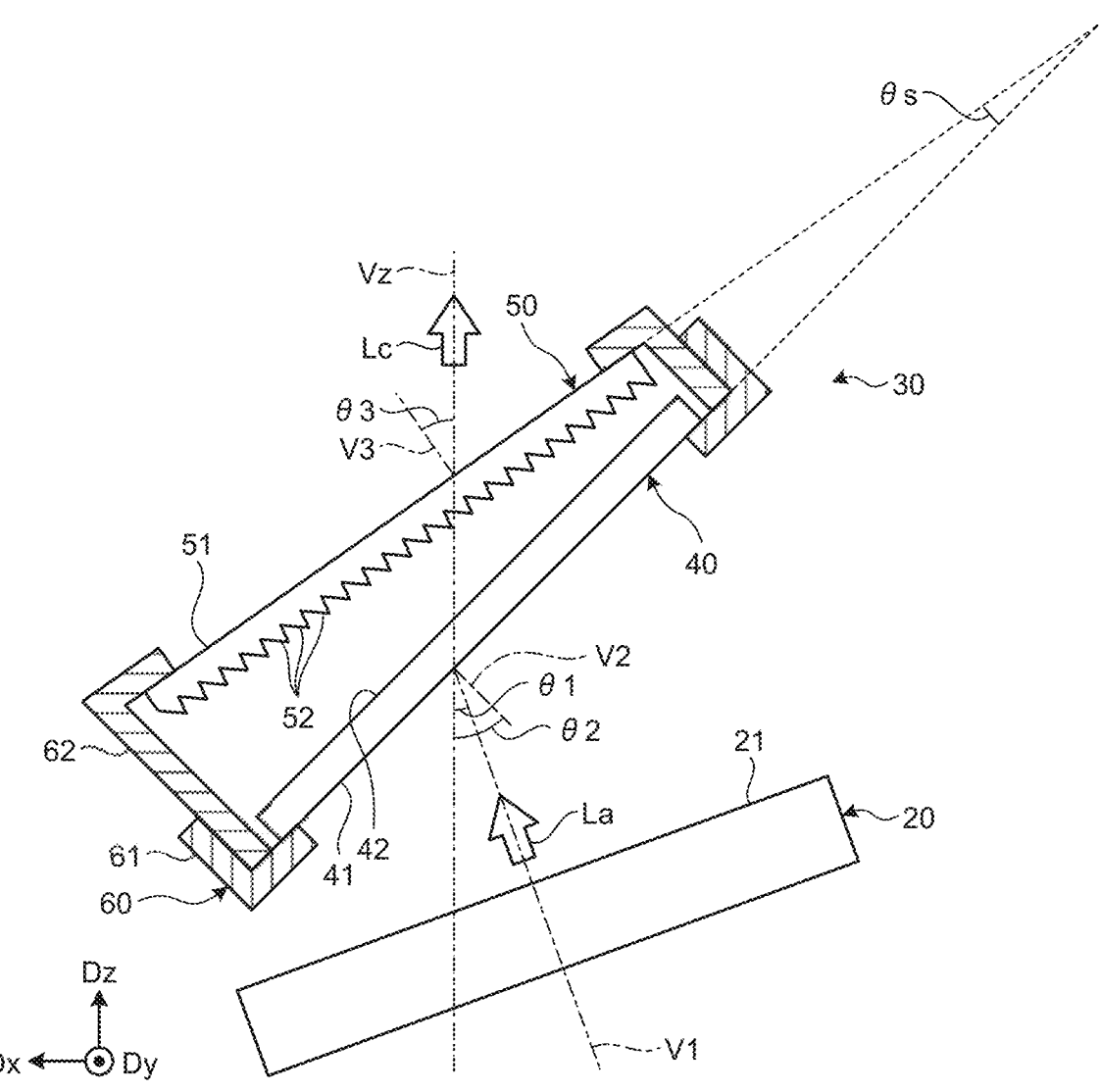
FIG. 2 is a schematic diagram of a light source and an image output device.

FIG. 2 is a schematic diagram of the light source 20 and the image output device 30. The light source 20 has a light emitting element (not illustrated) such as a light emitting diode (LED) in its rectangular solid shaped case. The light source 20 emits light to the image output device An optical axis of light emitted from the light source is orthogonal to a light source emission surface 21 of the light source 20. The light source emission surface 21 is parallel to the Dy direction and tilted with respect to an output axis Vz, around an axial line parallel to the DY direction (hereinafter described as the Dy axial line). The output axis Vz serves as the axial line along which the optical axis of emission light Lc emitted from the image output device 30 is caused to be. The emission light Lc will be described later. Specifically, the output axis Vz is parallel to the Dz direction and extends from the image output device 30 toward the optical member 70.

An angle made between a perpendicular line V1 of the light source emission surface 21 and the output axis Vz is described as a first tilt angle $\theta 1$. The first tilt angle $\theta 1$ is an acute angle. The light source emission surface 21 may not be tilted with respect to the output axis Vz but may be orthogonal to the output axis Vz. In this case, the first tilt angle θ1 is zero.

Light emitted from the light source 20 enters the image output device 30 as incident light La. The optical axis of the incident light La is parallel to the perpendicular line V1. The image output device 30 transmits and refracts the incident light La to emit emission light Lc along the output axis Vz. The image output device 30 includes a liquid crystal panel 40, a prism sheet 50, and a supporter 60.

The liquid crystal panel 40 transmits light emitted from the light source 20 and projects an image. The liquid crystal panel 40 is a transmissive liquid crystal display panel. The liquid crystal panel 40, which faces the light source 20, has a panel incident surface 41 on which light emitted from the light source 20 is incident as the incident light La and a panel emission surface 42 from which the incident light La is emitted as transmitted light transmitted through the liquid crystal panel 40.

The panel incident surface 41 and the panel emission surface 42 are parallel to each other. The panel incident surface 41 and the panel emission surface 42 are tilted around the Dy axial line with respect to the light source emission surface 21. An angle made between a perpendicular line V2 of the panel incident surface 41 and the output axis Vz is described as a second tilt angle θ2. The second tilt angle θ2 is an acute angle and larger than the first tilt angle θ1. The second tilt angle θ2 may be equal to the first tilt angle θ1.

The liquid crystal panel 40 has a plurality of pixels that are driven by an active matrix method. The pixels are arranged two-dimensionally along a plate surface of the liquid crystal panel 40. In an image output region (not illustrated) in which the pixels are arranged, the pixels are individually controlled to form a pattern of transmitted light corresponding to an image projected as the virtual image VG. This adjusts the amount of light when the incident light La is transmitted through the image output region. As a result, the incident light La transmitted through the image output region is emitted as transmitted light. The optical axis of the incident light La and the optical axis of transmitted light are parallel to each other.

The prism sheet 50 refracts light transmitted through the liquid crystal panel 40. Specifically, the prism sheet refracts the transmitted light emitted from the panel emission surface 42, and then emits the transmitted light as the emission light Lc along the output axis Vz. This means that the optical axis of the emission light Lc is tilted with respect to the optical axis of the incident light La, which is parallel to the optical axis of the transmitted light. The prism sheet 50 emits the emission light Lc toward the optical member 70. The prism sheet 50 is tilted with respect to the plate surface of the liquid crystal panel 40. The prism sheet 50 has a sheet surface 51 and a plurality of prisms 52.

The sheet surface 51 is tilted with respect to the plate surface of the liquid crystal panel 40. Specifically, the sheet surface 51 is tilted around the Dy axial line with respect to the panel emission surface 42 of the liquid crystal panel 40. An angle made between a perpendicular line V3 of the sheet surface 51 and the output axis Vz is described as a third tilt angle θ3.

The third tilt angle θ3 corresponds to the emission angle of the emission light Lc emitted from the sheet surface 51. The third tilt angle θ3 is an acute angle. The details of the relation between the second tilt angle θ2 and the third tilt angle θ3 will be described later.

The prisms 52 face the plate surface of the liquid crystal panel 40 on the opposite side to the sheet surface 51. Specifically, the prisms 52 face the panel emission surface 42 of the liquid crystal panel 40.

Figure 3:
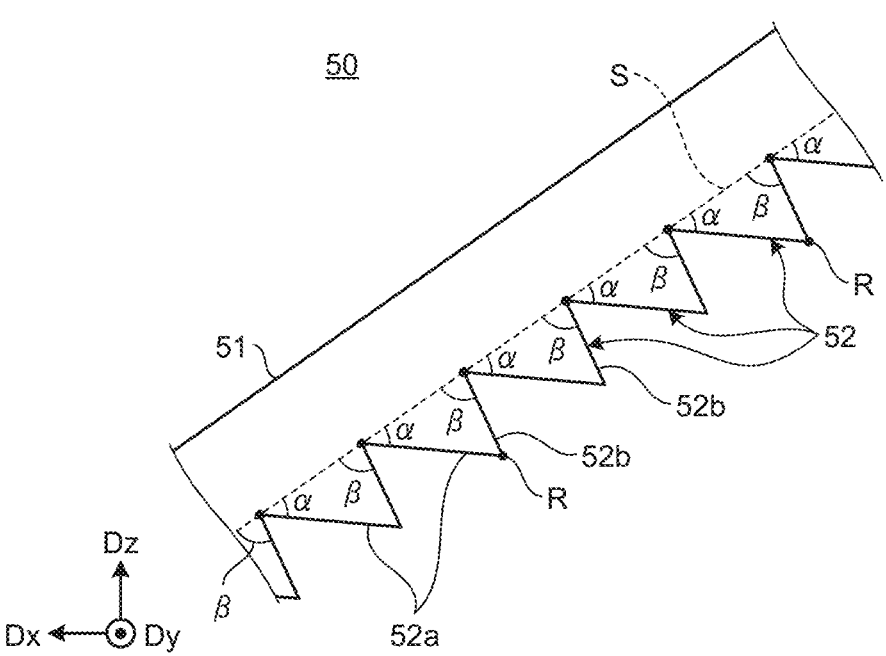
FIG. 3 is an enlarged side view of a prism sheet.

FIG. 3 is an enlarged side view of the prism sheet 50. The prisms 52 are arranged on a flat surface S parallel to the sheet surface 51. The prisms 52 are each formed to have an angular cross section by a first prism surface 52a and a second prism surface 52b.

The first prism surface 52a and the second prism surface 52b are each tilted around the Dy axial line with respect to the sheet surface 51. An angle made between the second prism surface 52b and the sheet surface 51 is larger than an angle made between the first prism surface 52a and the sheet surface 51. In other words, a first prism angle a made between the first prism surface 52a and the sheet surface 51 is smaller than a second prism angle β made between the second prism surface 52b and the sheet surface 51. The first prism angle α and the second prism angle β are determined such that the transmitted light along the perpendicular line V2 is refracted and emitted as the emission light Lc along the output axis Vz.

The prisms 52 are arranged in a parallel manner. Specifically, the prisms 52 are each arranged such that a ridge line R formed by the first prism surface 52a and the second prism surface 52b is along the Dy axial line. In other words, the prisms 52 are arranged such that the ridge lines R are parallel to one another.

In two adjacent prisms 52 of the prisms 52, the first prism surface 52a of one prism 52 and the second prism surface 52b of the other prism 52 are formed continuously. The flat surface S is, thus, not exposed.

As illustrated in FIG. 2, the supporter 60 supports the liquid crystal panel 40 and the prism sheet 50. The supporter 60 includes a first support member 61 and a second support member 62. The first support member 61 supports the liquid crystal panel 40. Specifically, the first support member 61 supports a peripheral portion of the panel incident surface 41 and is adhesively bonded to the peripheral portion of the panel incident surface 41 with an adhesive or the like. The first support member 61 supports the second support member 62. The second support member 62 supports the prism sheet 50 such that the prism sheet 50 is tilted with respect to the liquid crystal panel Specifically, the second support member 62 supports a peripheral portion of the sheet surface 51 and is adhesively bonded to the peripheral portion of the sheet surface 51 with an adhesive or the like.

As illustrated with dashed arrows in FIG. 1, the optical member 70 guides the emission light Lc to the light-transmitting body 2 through an opening 11 of the housing 10. Specifically, the optical member 70 is a concave mirror. The optical member 70 may include a plurality of concave mirrors and reflective mirrors.

The emission light Lc guided by the optical member 70 is projected onto the light-transmitting body 2. The user U, who directs the line of sight to the emission light Lc projected onto the light-transmitting body 2, visually recognizes the virtual image VG.

As described above, the emission light Lc is emitted from the image output device 30 along the output axis Vz while the panel emission surface 42 of the liquid crystal panel 40 is tilted around the Dy axial line with respect to the output axis Vz. This allows the user U to visually perceive the virtual image VG as if the virtual image VG has three-dimensional effect in the Dz direction.

As described above, the light source emission surface 21 of the light source 20 is tilted around the Dy axial line with respect to the output axis Vz. This structure causes the incident angle of the incident light La that is emitted from the light source emission surface 21 and enters the panel incident surface 41 to be smaller than the case where the light source emission surface 21 is orthogonal to the output axis Vz. This can inhibit reduction in luminance of light forming the virtual image VG and reduction in contrast of the virtual image VG.

The following describes a relation between the second tilt angle θ2 and the third tilt angle θ3 in detail. In the HUD 1, light Lg from outside the HUD 1 such as sunlight (hereinafter described as external light) may enter inside the housing 10 through the opening 11, travel along the output axis Vz, i.e., the direction opposite to the travelling direction of the emission light Lc, and be reflected by the prism sheet 50 or the like, in some cases. When the reflected light overlaps with the virtual image VG, the visibility of the virtual image VG is lowered.

The relation between the second tilt angle θ2 and the third tilt angle θ3 is determined such that overlapping of the reflected light and the virtual image VG is prevented. Specifically, the difference between the second tilt angle θ2 and the third tilt angle θ3 is determined based on a reflection angle of the reflected light as described below. The difference between the second tilt angle θ2 and the third tilt angle θ3 corresponds to an angle made between the sheet surface 51 and the plate surface (the panel emission surface 42) of the liquid crystal panel 40 as illustrated in FIG. 2. Hereinafter, the angle between the sheet surface 51 and the plate surface of the liquid crystal panel 40 is described as a relative angle θs.

Figure 4:
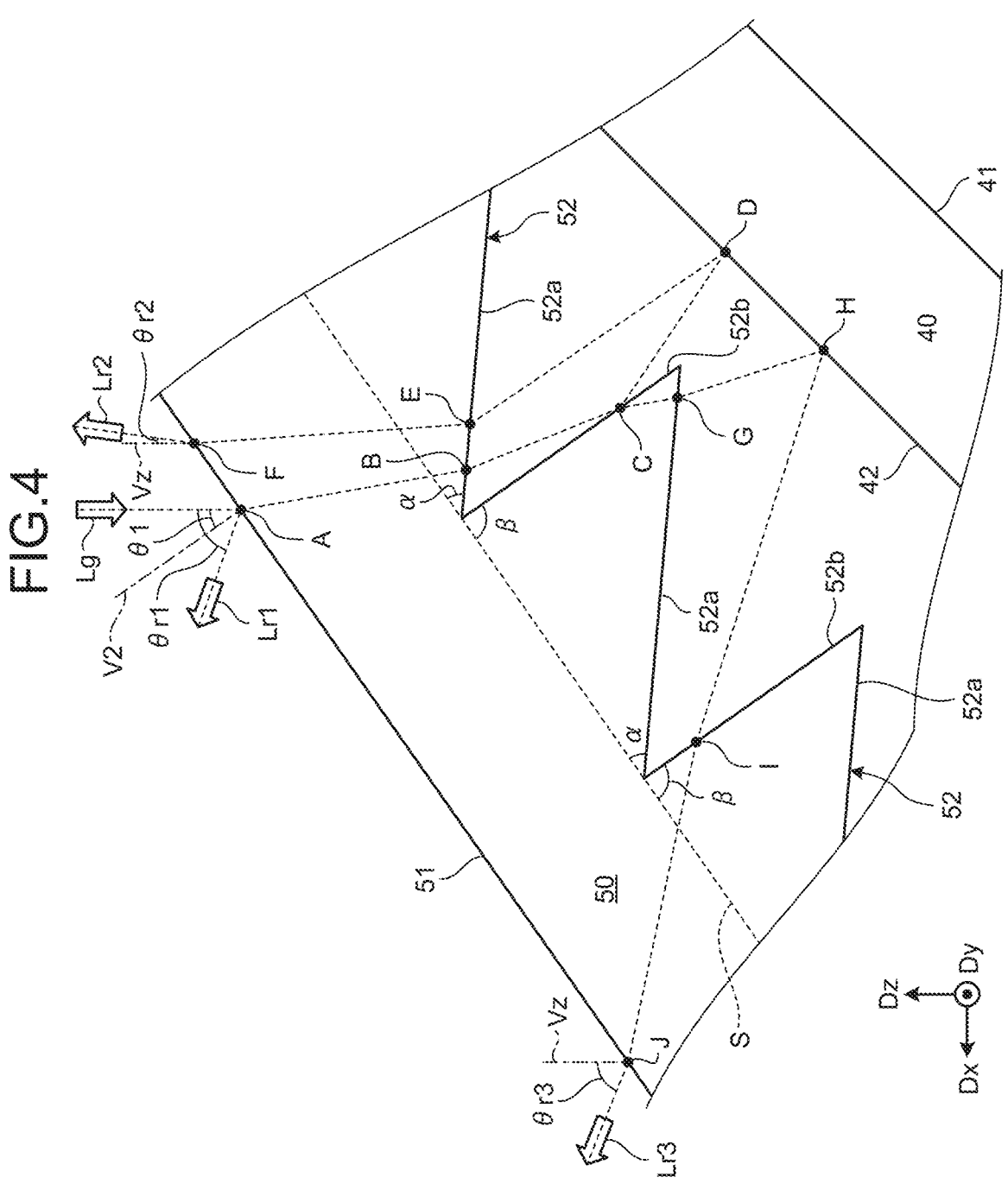
FIG. 4 is a diagram illustrating travelling of external light and reflected light in the image output device.

FIG. 4 is a diagram illustrating travelling of the external light Lg and reflected light in the image output device 30. FIG. 4 illustrates the travelling of the external light Lg with the dashed line. The reflected light is light of the external light Lg reflected by the prism sheet 50, the panel emission surface 42, and the like. The reflection angle of the reflected light is defined as an angle made between the optical axis of the reflected light and the output axis Vz.

In FIG. 4, the second tilt angle θ2 of the panel emission surface 42 is 45° while the third tilt angle θ3 of the sheet surface 51 is 35°. FIG. 4 illustrates a case where the relative angle θs is 10°. In FIG. 4, the first prism angle α is 40° while the second prism angle β is 90°.

The external light Lg travels along the output axis Vz and reaches point A on the sheet surface 51. Part of the external light Lg reaching the point A is reflected at the point A on the sheet surface 51. The external light Lg reflected at the point A is described as first reflected light Lr1. An angle made between the optical axis of the first reflected light Lr1 and the output axis Vz is described as a first reflection angle θr1. The first reflected light Lr1 is reflected one time at the point A on the sheet surface 51.

The external light Lg that is not reflected at the point A on the sheet surface 51 is refracted at the point A and enters the prism sheet 50, and then is refracted at point B on the first prism surface 52a and emitted from the prism sheet 50. The refraction angle of the external light Lg depends on a relative refractive index between the material of the prism sheet 50 and air outside the prism sheet 50.

Part of the external light Lg emitted from the point B on the first prism surface 52a is reflected at point C on the second prism surface 52b, and then reflected at point D on the panel emission surface 42. The external light Lg reflected at the point D is refracted at point E on the first prism surface 52a and enters the prism sheet 50, and then is refracted at point F on the sheet surface 51 and emitted from the prism sheet 50. The external light Lg emitted from point F is described as second reflected light Lr2. An angle made between the optical axis of the second reflected light Lr2 and the output axis Vz is described as a second reflection angle θr2.

The second reflected light Lr2 is reflected two times in total, i.e., at the point C on the second prism surface 52b and the point D on the panel emission surface 42. The prism sheet 50 and the liquid crystal panel 40 each have a specific reflection ratio (e.g., 8%) based on the material and other factors. As the number of reflections increases, light amount decreases. The number of reflections of the second reflected light Lr2 is larger than that of the first reflected light Lr1. The amount of the second reflected light Lr2 is smaller than that of the first reflected light Lr1.

The external light Lg that is not reflected at the point C on the second prism surface 52b is refracted at the point C and enters the prism sheet 50, and then is refracted at point G on the first prism surface 52a and emitted from the prism sheet 50. The external light Lg emitted from point G on the first prism surface 52a is reflected at point H on the panel emission surface 42, and then is refracted at point I on the second prism surface 52b and enters the prism sheet 50, and is refracted at point J on the sheet surface 51 and emitted from the prism sheet 50. The external light Lg emitted from point J is described as third reflected light Lr3. An angle made between the optical axis of the third reflected light Lr3 and the output axis Vz is described as a third reflection angle θr3.

The third reflected light Lr3 is reflected one time at point H on the panel emission surface 42. The number of reflections of the second reflected light Lr2 is larger than that of the third reflected light Lr3. The amount of the second reflected light Lr2 is smaller than that of the third reflected light Lr3. When the amount of the reflected light is relatively small such as the case of the second reflected light Lr2, even if the reflected light overlaps with the virtual image VG, deterioration of the visibility of the virtual image VG is inhibited.

When the reflected light is largely tilted with respect to the output axis Vz, the reflected light does not overlap with the virtual image VG, thereby inhibiting deterioration of the visibility of the virtual image VG. In view of such facts, the difference between the second tilt angle θ2 and the third tilt angle θ3, i.e., the relative angle θs, is determined such that the reflected light reflected one time is relatively largely tilted with respect to the output axis Vz. In other words, the relative angle θs is determined such that the first reflection angle θr1 and the third reflection angle θr3 are relatively large. It is desirable that the second reflection angle θr2, which is the reflection angle of the second reflected light Lr2 reflected two times, be relatively larger.

FIG. 4 illustrates the travelling of the external light Lg after reaching the point A on the prism sheet 50. There are, however, cases where the external light Lg reaches the prism sheet 50 at another point other than point A and reflected light is emitted as the reflected light having a reflection angle different from those of the first reflected light Lr1, the second reflected light Lr2, and the third reflected light Lr3 that are illustrated in FIG. 4. In view of such cases, when the relative angle θs is determined, a simulation is performed to derive reflection angles of reflected light based on a plurality of beams of external light Lg entering the prism sheet 50 at different incident positions.

Figure 5:
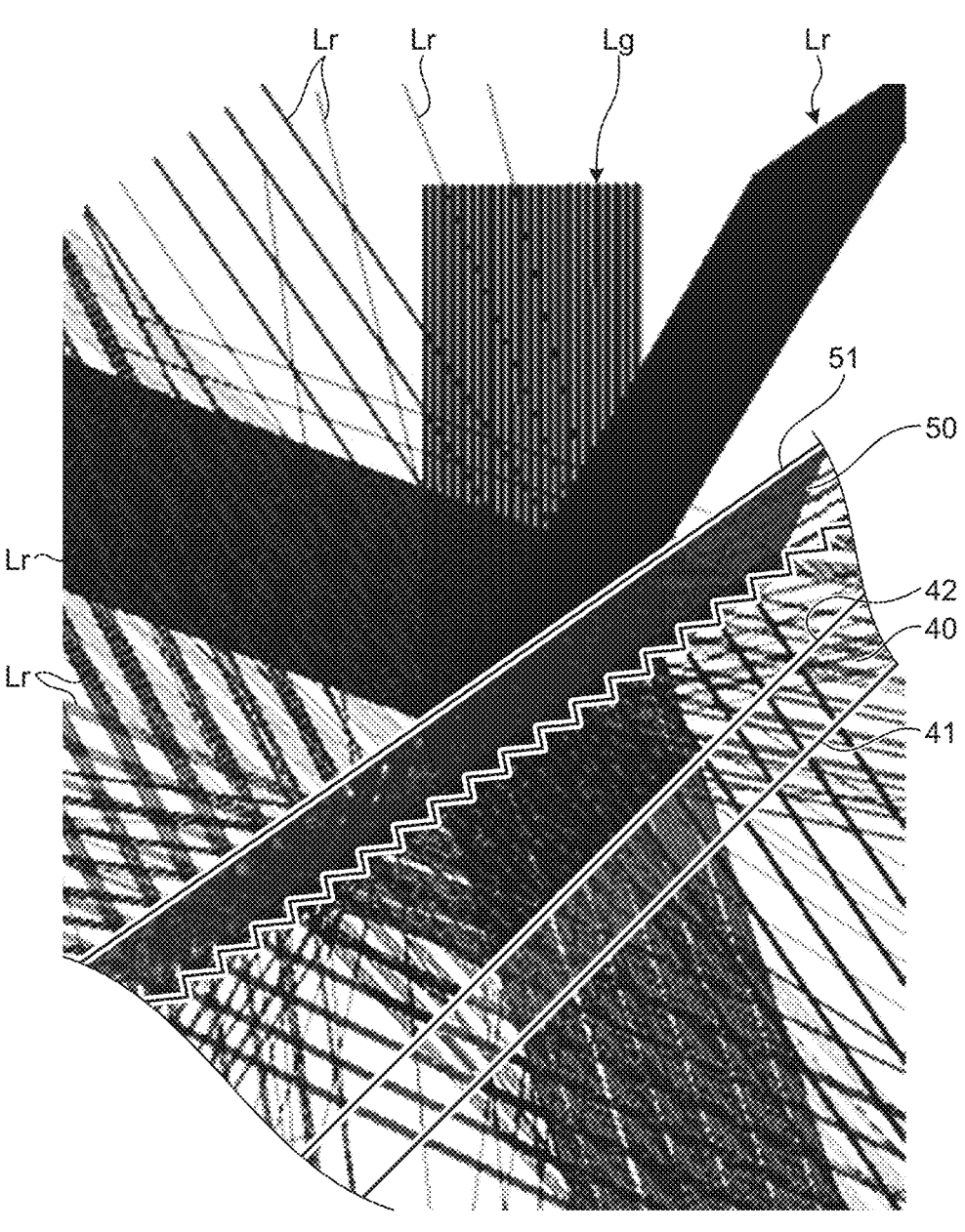
FIG. 5 is a diagram illustrating an example of reflected light simulation results.

FIG. 5 is a diagram illustrating an example of reflected light simulation results. In FIG. 5, the second tilt angle θ2 of the panel emission surface 42 is 45° while the third tilt angle θ3 of the sheet surface 51 is 35°. The relative angle θs is thus 10°. The first prism angle α is 30°while the second prism angle β is 70°. One hundred light beams of the external light Lg enter the sheet surface 51 at positions different from one another.

The beams of external light Lg that enter the sheet surface 51 are reflected and refracted by the sheet surface 51, the prisms 52, and the like and emitted from the sheet surface 51 as a plurality of beams of reflected light Lr, as described above. In this simulation, the number of reflections is limited to two or fewer. However, total reflections are not counted as the number of reflections.

Table 1 illustrates an example of the reflected light Lr simulation results. In the simulation, the second tilt angle θ2 of the panel emission surface 42 is 45°, the first prism angle α is 30°, and the second prism angle β is 70°. In addition, the third tilt angle θ3 of the sheet surface 51 is changed from 25° to 45° in 5° steps, i.e., the relative angle θs is changed from 0° to 20° in 5° steps. Table 1 illustrates the smallest reflection angle of the reflected light Lr reflected one time out of the beams of reflected light Lr for each relative angle θs.

As the reflection angle of the reflected light Lr is increased, the reflected light Lr is largely tilted with respect to the output axis Vz. As a result, the reflected light Lr does not overlap with the virtual image VG. In other words, as the reflection angle is increased, the results are more favorable.

In Table 1, the reflection angles are relatively large when the relative angle θs is larger than or equal to 10° and not larger than 15°. It is, thus, preferable that the relative angle θs be larger than or equal to 10° and not larger than 15°.

TABLE 1

| Relative angle | 0° | 5° | 10° | 15° | 20° |
|---|---|---|---|---|---|
| Reflection angle | 6.7° | 17.8° | 30.3° | 27.3° | 19.7° |

When the relative angle θs is larger than 20°, the prism sheet 50 cannot refract the transmitted light to emit the emission light Lc along the output axis Vz. The simulation is thus performed with the relative angle θs larger than or equal to 0° and not larger than 20°.

In the simulation described above, the first prism angle α is 30°, the second prism angle β is 70°, and the second tilt angle θ2 of the panel emission surface 42 is 45°. In another simulation where the first prism angle α is in a range of 30±5°, the second prism angle β is in a range of 70±5°, and the second tilt angle θ2 is not 45°, favorable results are obtained due to the relatively large reflection angles when the relative angle θs between the sheet surface 51 and the plate surface (the panel emission surface 42) of the liquid crystal panel 40 is larger than or equal to 10° and not larger than 15°, which is the same as that in the simulation described above. When the second tilt angle θ2 is in a range from 35° to 45°, favorable results similar to those in the case where the second tilt angle θ2 is 45° are obtained.

Other effects provided by the modes described in the above-mentioned embodiment that are obvious from description of the present specification or at which those skilled in the art can appropriately arrive should naturally be interpreted to be provided by the present disclosure.

Figure 6:
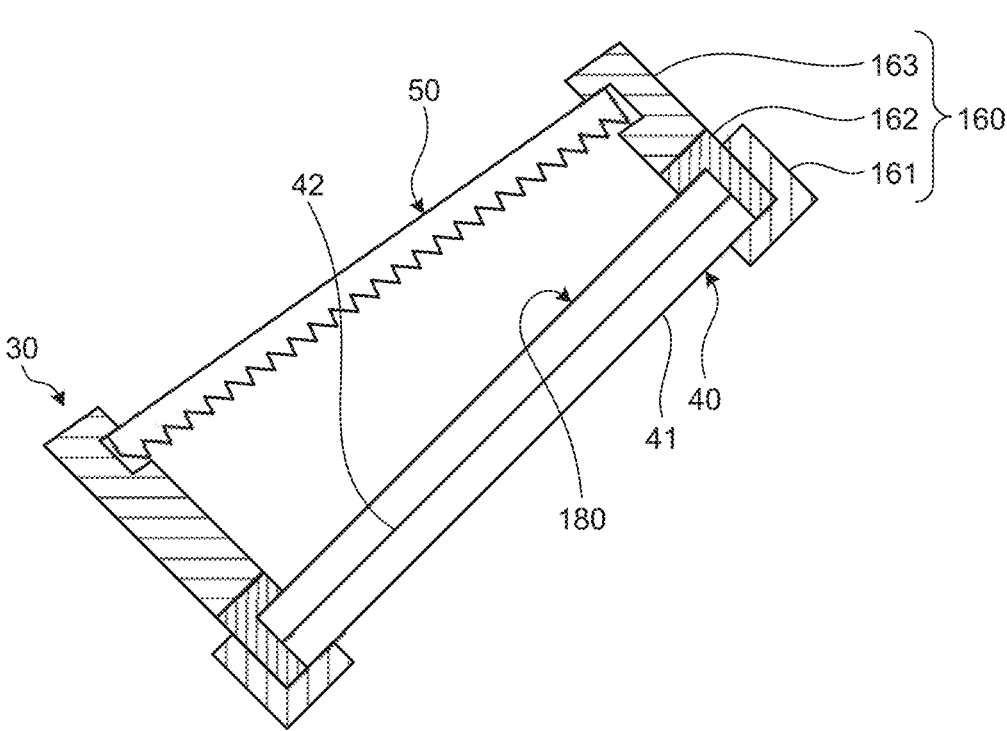
FIG. 6 is a schematic diagram of the image output device according to a modification of the embodiment.

FIG. 6 is a schematic diagram of the image output device 30 according to a modification of the embodiment. The image output device 30 according to the modification further includes a diffusion plate 180 between the liquid crystal panel 40 and the prism sheet 50. The diffusion plate 180 is attached to the panel emission surface 42. The diffusion plate 180 transmits incident light while diffusing the incident light. The diffusion plate 180 can reduce the occurrence of moiré. The diffusion plate 180 also reduces the amount of the reflected light Lr that is reflected by the panel emission surface 42 and emitted from the sheet surface 51. The diffusion plate 180, thus, can reduce deterioration of the visibility of the virtual image VG.

In a supporter 160 of the image output device 30 according to the modification, a first support member 161 supports the liquid crystal panel 40 and a second support member 162. The second support member 162 supports the peripheral portion of the diffusion plate 180. The supporter 160 further includes a third support member 163. The third support member 163, which is disposed on the second support member 162, supports the prism sheet 50 in such a manner that the plate surface (the panel emission surface 42) of the liquid crystal panel 40 is tilted with respect to the sheet surface 51. The third support member 163 supports the peripheral portion of the prism sheet 50 from both the sheet surface 51 side and the prisms 52 side.

The present disclosure is applicable to display devices other than the HUD 1. Examples of the display devices include navigation systems, smartphones, tablets, and virtual reality (VR) goggles.

What is claimed is:

1. A head-up display comprising:
   a light source;
   a liquid crystal panel that is configured to transmit light emitted from the light source and project an image;
   a prism sheet that is tilted with respect to a plate surface of the liquid crystal panel and configured to refract light transmitted through the liquid crystal panel;
   a sheet surface that is tilted with respect to the plate surface of the liquid crystal panel; and
   a plurality of prisms that face the plate surface of the liquid crystal panel on an opposite side to the sheet surface,
   wherein
   each of the plurality of prisms is formed to have an angular cross section by a first prism surface and a second prism surface, and the plurality of prisms are arranged in a parallel manner,
   the first prism surface is tilted with respect to the sheet surface,
   the second prism surface is tilted with respect to the sheet surface, and
   an angle made between the second prism surface and the sheet surface is larger than an angle made between the first prism surface and the sheet surface.

2. The head-up display according to claim 1, wherein an angle made between the sheet surface and the plate surface of the liquid crystal panel is larger than or equal to 10° and not larger than 15°.

3. The head-up display according to claim 1, wherein, in two adjacent prisms among the plurality of prisms, the first prism surface of one prism and the second prism surface of the other prism are formed continuously.

4. A display device comprising:
   a light source;
   a liquid crystal panel that is configured to transmit light emitted from the light source and project an image;
   a prism sheet that is tilted with respect to a plate surface of the liquid crystal panel and configured to refract light transmitted through the liquid crystal panel;
   a sheet surface that is tilted with respect to the plate surface of the liquid crystal panel; and a plurality of prisms that face the plate surface of the liquid crystal panel on an opposite side to the sheet surface, wherein each of the plurality of prisms is formed to have an angular cross section by a first prism surface and a second prism surface, and the plurality of prisms are arranged in a parallel manner, the first prism surface is tilted with respect to the sheet surface, the second prism surface is tilted with respect to the sheet surface, and an angle made between the second prism surface and the sheet surface is larger than an angle made between the first prism surface and the sheet surface.

\* \* \* \* \*